(12) United States Patent
Shimbo et al.

(10) Patent No.: US 8,233,047 B2
(45) Date of Patent: Jul. 31, 2012

(54) OBJECT DETECTION SYSTEM

(75) Inventors: Naoyuki Shimbo, Saitama (JP); Shigeru Ikewada, Hamura (JP); Miyuki Fujii, Suginami-ku (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 296 days.

(21) Appl. No.: 12/666,841

(22) PCT Filed: Mar. 5, 2008

(86) PCT No.: PCT/JP2008/053969
§ 371 (c)(1),
(2), (4) Date: Dec. 28, 2009

(87) PCT Pub. No.: WO2009/050906
PCT Pub. Date: Apr. 23, 2009

(65) Prior Publication Data
US 2010/0182433 A1    Jul. 22, 2010

(30) Foreign Application Priority Data
Oct. 17, 2007    (JP) .................................. 2007-269794

(51) Int. Cl.
*H04N 7/18*    (2006.01)
(52) U.S. Cl. ........................................ 348/153; 348/149
(58) Field of Classification Search .................. 348/153
See application file for complete search history.

(56) References Cited

U.S. PATENT DOCUMENTS

| 5,574,762 | A | * | 11/1996 | Sato et al. ......................... 377/6 |
|---|---|---|---|---|
| 5,748,775 | A | * | 5/1998 | Tsuchikawa et al. .......... 382/190 |
| 6,915,008 | B2 | * | 7/2005 | Barman et al. ................. 382/154 |
| 7,672,510 | B2 | * | 3/2010 | Nagaoka et al. ............... 382/170 |
| 2002/0103617 | A1 | * | 8/2002 | Uchiyama et al. ............. 702/150 |
| 2003/0137593 | A1 | * | 7/2003 | Watanabe et al. ............. 348/274 |
| 2007/0008340 | A1 | * | 1/2007 | Endo et al. .................... 345/633 |
| 2007/0039030 | A1 | * | 2/2007 | Romanowich et al. ....... 725/105 |
| 2008/0069405 | A1 | * | 3/2008 | Endo et al. .................... 382/106 |

FOREIGN PATENT DOCUMENTS

| JP | 62-204381 | 9/1987 |
|---|---|---|
| JP | 3-182185 | 8/1991 |
| JP | 5-7363 | 1/1993 |
| JP | 7-29015 | 1/1995 |
| JP | 10-255019 | 9/1998 |
| JP | 2002-157599 | 5/2002 |
| JP | 2003-6642 | 1/2003 |
| JP | 2004-094673 | 3/2004 |
| JP | 2004-219277 | 8/2004 |
| JP | 2004-304249 | 10/2004 |
| JP | 2007-45336 | 2/2007 |

* cited by examiner

*Primary Examiner* — John Follansbee
*Assistant Examiner* — Anthony Mejia
(74) *Attorney, Agent, or Firm* — Brundidge & Stanger, P.C.

(57) ABSTRACT

A detection system that uses a plurality of input devices with different sensitive wavelengths as image and signal acquisition devices for detecting an intruding object and which performs coordinated processing on at least two or more pieces of information to avoid issuing false alarms during an intruding object detection. Based on the position or size of an object detected by processing an input from one of the input devices, an area range in which to process an input from other input devices is defined. According to one or more of processing results, a check is made as to the presence or absence of an intruding object.

5 Claims, 6 Drawing Sheets

OBJECT DETECTION SYSTEM

CROSS REFERENCE TO RELATED APPLICATIONS

This application claims the benefit of Japanese Patent Application No. 2007-269794, filed Oct. 17, 2007, which is incorporated herein by reference in its entirety.

BACKGROUND OF THE INVENTION

1. Field of the Invention

The present invention relates to an object detection system which automatically detects an intruding object by using image devices, such as visible light cameras, near- and far-infrared cameras and millimeter-wave cameras, and also millimeter-wave sensors and laser sensors.

2. Description of the Related Art

Conventional object detection systems detect an object by either processing images from a visible light camera, or processing videos from a near- or far-infrared camera and a millimeter-wave camera, or detecting an object with a millimeter-wave sensor or laser sensor and determining the presence or absence of the object and its position. One of these processes is chosen according to the use.

As technologies related to this invention, there have been known those technologies that detect an object based on videos picked up by a visible light camera and an infrared camera at almost the same angle of view (refer to the following patent document 1 to 5 for example).

Patent document 1: JP-A-3-182185
Patent document 2: JP-A-2007-45336
Patent document 3: JP-A-2002-157599
Patent document 4: JP-A-10-255019
Patent document 5: JP-A-62-204381

However, since a variety of imaging devices and sensors used in the conventional object detection systems have different sensitive wavelength ranges and therefore different detection performances depending on an object to be detected, environmental conditions and sunlight, they have latent factors for erroneous operations.

That is, various imaging devices have their own weak points in detection performance. So a system using such image devices as is cannot be adopted for applications that require a stable detection performance under complex conditions, such as detection of pedestrians at a crossing, detection of a person who has fallen off a station platform and detection of obstacles on railroad tracks and crossings.

BRIEF SUMMARY OF THE INVENTION

This invention has been accomplished under these circumstances and it is an object of this invention to realize an object detection system that executes coordinated processing on detection signals from a plurality of imaging devices to enhance the detection precision and thereby enable the system to be applied to markets and fields where high levels of detection performance are required.

This invention takes advantage of different sensitive wavelength ranges of the sensors used and performs coordinated processing on results of their image processing and results of their position information decision to realize a high detection performance.

For example, objects need to be detected with high sensitivity under a wide range of environmental conditions, including sunlight changes in one day (morning, daytime, evening and night) and among different seasons and weather changes (sunny, cloudy, rainy, snowy and foggy). So, a plurality of imaging devices capable of sensing and imaging objects even under these environmental conditions are installed side by side.

Figure 6:
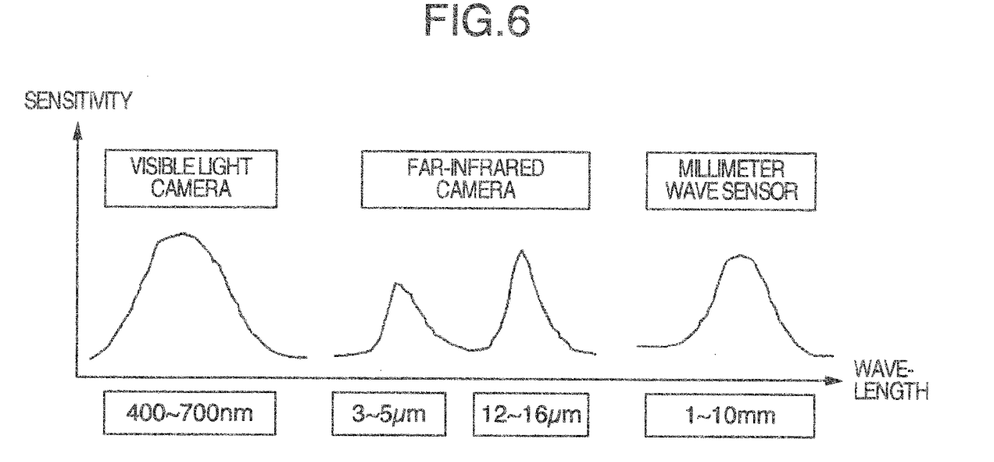
FIG. 6 shows sensitive wavelength ranges of main imaging means applicable in a monitoring system.

FIG. 6 shows sensitive wavelength ranges of a visible light camera, a far-infrared camera and a millimeter wave camera, all primary imaging means that may be used in a monitoring system.

The wavelength range of the visible light camera, though it can produce the same image as the one seen with naked eyes, includes extraneous noise from sunlight during the image processing. The far-infrared camera range renders far-reflections from sunlight and far-infrared rays from a heat radiating object visible but cannot produce a visible image of non-heat radiating objects. The millimeter wave camera renders a minute millimeter wave signal radiated from an object visible but, because of the weak signal, cannot produce a clearly defined overall image of the object. These may be summarized in the following table.

TABLE 1

| | Items to be compared | Visible light camera | Far-infrared camera |
|---|---|---|---|
| Object recognition capability in image processing | Heat radiating object | ○ | ○ |
| | Non-heat radiating object | ○ | X |
| Capability to recognize humans | Day | ○ | Δ |
| | Night | Δ | ○ |
| | No light | X | ○ |
| Environmental noise resistance in image processing | Brightness change | X | ○ |
| | Temp. change | ○ | X |
| | Weather change | X | Δ |

○: not affected; Δ: slightly affected; X: affected

As described above, these imaging devices have their own merits and shortcomings. With these characteristics taken into account, the shortcoming of one device is complimented by the result of image and signal processing of other sensing devices in a form of coordinated processing to realize an object detection system with an enhanced detection capability.

More specifically, the object detection system of this invention uses a first and a second electromagnetic wave detection means having different sensitive wavelengths and executes coordinated processing on detected, information to detect an object; wherein the first electromagnetic wave detection means image-picks up an object being monitored as a two-dimensional image; wherein, in the two-dimensional image picked up by the first electromagnetic wave detection means, an area range is determined based on the detected information from the second electromagnetic detection means and, in that area range, image processing is performed to detect the object.

Further, the first electromagnetic wave detection means is a visible light camera and the first electromagnetic wave detection means is a far-infrared camera, the visible light camera and the far-infrared camera being arranged side by side to image-pick up essentially the same object being monitored; each of the two-dimensional images picked up by the visible light camera and the far-infrared camera is subjected to a background image generation and update operation, a subtraction operation between the background image and the two-dimensional image, a binarization operation and a labeling operation, to recognize the object; the area range is determined from a position of the recognized object in the two-dimensional image taken by the far-infrared camera; and in the two-dimensional image taken by the visible light camera, the object recognition operation is performed again within the area range and, lien object is recognized, it is decided that the recognized object is the object to be detected.

With this invention, since an intruder is reliably detected using a far-infrared image that is hardly affected by extraneous noise, such as sways of tree shades, and environmental changes and an object detection is performed on a visible light image within the area range set around the intruder, a false alarm can be avoided while at the same time preventing possible failure to detect the object, thus realizing a high level of detection performance.

Other objects, features and advantages of this invention will become apparent from the following descriptions of embodiments with reference to the accompanying drawings.

DETAILED DESCRIPTION OF THE INVENTION

Example embodiments of this invention will be described by referring to the accompanying drawings.

Figure 1:
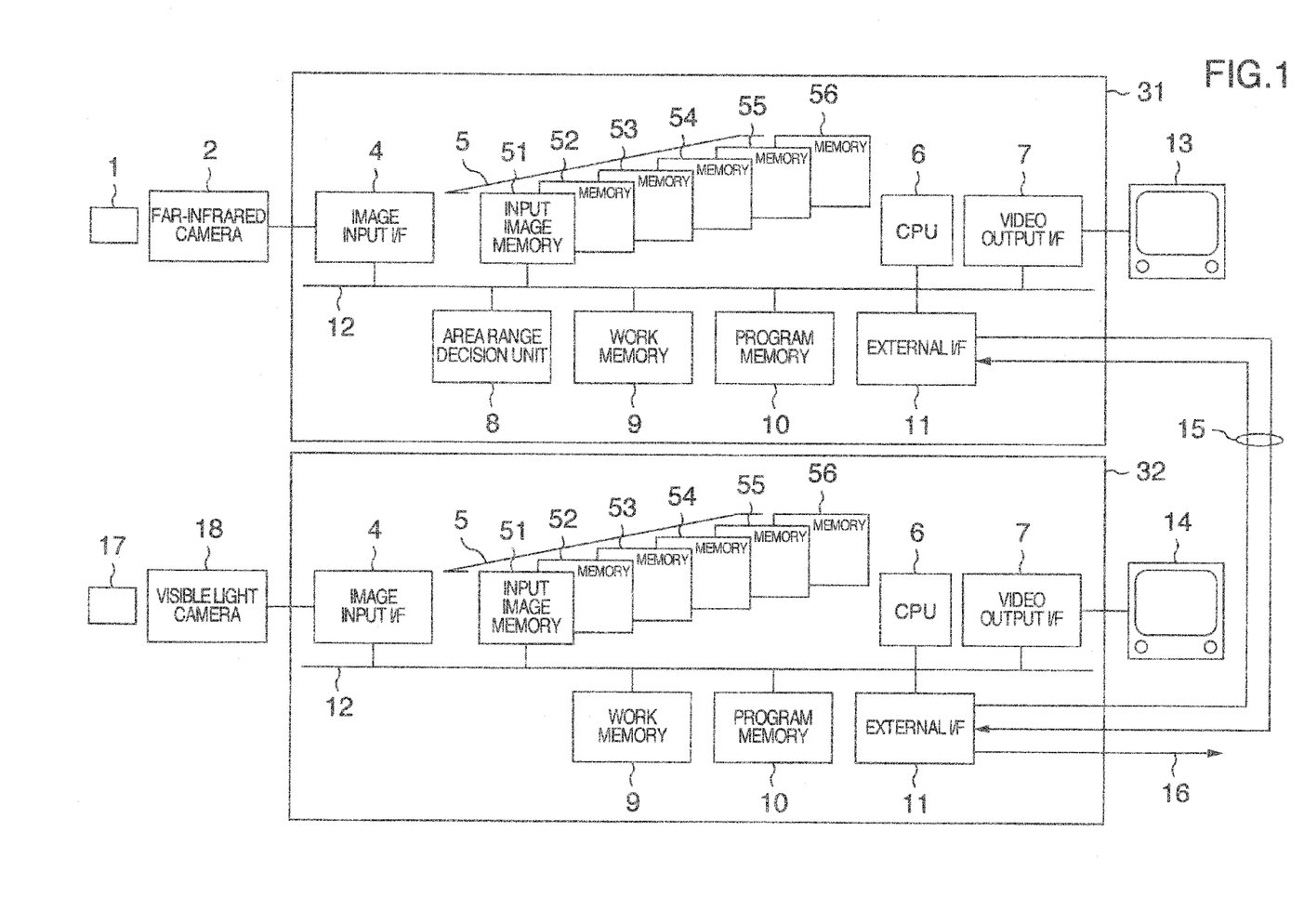
FIG. 1 shows a configuration of the object detection system as one embodiment of this invention.

FIG. 1 is a configuration diagram of an object detection system of embodiment 1.

The object detection system of this example has a far-infrared lens 1, a far-infrared camera 2, image processing devices 31, 32, video monitors 13, 14, a visible light lens 17 and a visible light camera 18. The far-infrared lens 1 is made by polishing a semiconductor, such as germanium, silicon and amorphous chalcogenide, and has a penetrability in a wavelength range of 5 μm or higher. The far-infrared lens 1 is directed toward an object to be photographed and then connected to the far-infrared camera 2 to focus incoming light from the object on an imaging surface.

The far-infrared camera 2 has an image pickup device composed, for example, of two-dimensionally arrayed bolometers and an image signal processor for shading correction. The camera 2 outputs a far-infrared image (thermal image) of the target object to the image processing device 31.

The image processing device 31 has an image input I/F 4, an image memory 5, a CPU 6, a video output I/F 7, an area range decision unit 8, a work memory 9, a program memory 10, an external I/F 11, and a data bus interconnecting these.

The image input I/F 4 stores the thermal image supplied from the far-infrared camera 2 in an input image memory 51 of the image memory 5 as an image having a brightness level at one of 256 grayscale levels (from 0 to 255). If the far-infrared camera 2 is of analog output type, the image input I/F 4 also performs an A/D conversion on the thermal image.

The image memory 5 has an input image memory 51 for recording an input image, a background image memory 52 to store a background image to be used for object detection, work image memories 53, 54 to perform calculation between the image memories, an output image memory 55 to record an inter-memory calculation result, and a binary image memory 56 to store a binary image, these memories having enough capacity for image processing.

The program memory 10 stores programs that cause the CPU 6 to execute image processing.

The work memory 9 is used to store and analyze data acquired by the image processing by the CPU 6, such as coordinates of a position of the object detected and a history of the object movement.

Upon detection of an intruding object, the area range decision unit 8, based on the position coordinates in the image memory 5 and the size of the intruder, calculates a possible area range to which the object is likely to be carried by human and then outputs area range information.

The video output I/F 7 outputs the state the image processing to the video monitor 13.

The external I/F 11, when an intruder is detected, outputs the area range information 15, inputs the area range information 15 from the image processing device 32 and outputs an alarm output 16.

An eye-viewed image on the other hand is picked up through the known visible light lens 17 by the visible light camera 18 and supplied to the image processing device 32. The visible light lens 17 is arranged by the side of the far-infrared lens 1 to image-pick up the same monitor object as that of the far-infrared lens 1 at the similar view angle.

The image processing device 32 has almost the same construction as the image processing device 31, except that it does not have the area range decision unit 8. The constitutional components are given like reference numerals for convenience. The image processing devices 31, 32 are interconnected via their external I/F 11 so that they can exchange the area range information.

The program memory 10 in the image processing device 32 stores a program that causes the CPU 6 to develop the area range information 15 acquired from the image processing device 31 on the image memory and execute the object detection processing only in that range. As described later, by not executing the detection processing in other than that range, other ranges subjected to extraneous noise caused by brightness are excluded from the processing, which realizes an object detection only in a reliable range.

Figure 2:
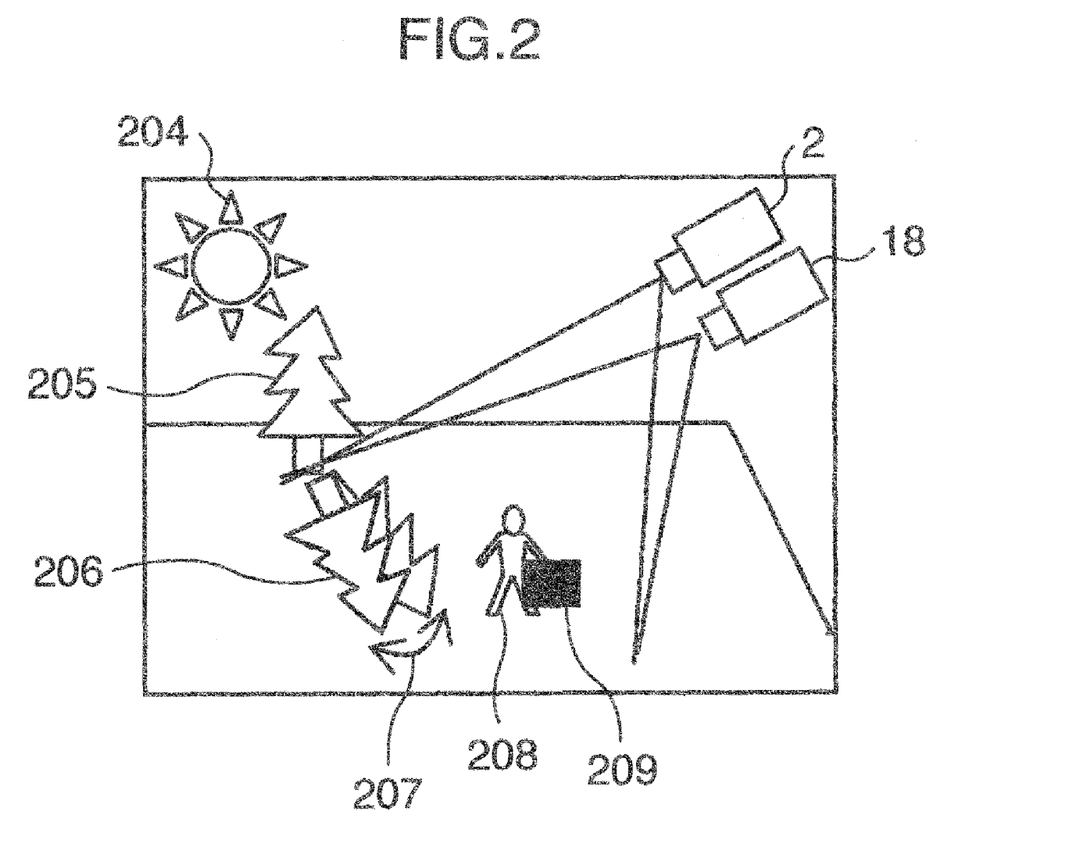
FIG. 2 shows a monitoring environment of the object detection system as one embodiment of this invention and the state of the far-infrared camera 2 and the visible light camera 18.

FIG. 2 shows a, monitoring environment of the object detection system of this embodiment and the installed state of the far-infrared camera 2 and the visible light camera 18.

In the environment of the monitored area, a shadow of tree 206 is formed behind a tree 205 by the sun 204. When the tree 205 sways in the wind, the tree shadow 206 includes the sway 20. To detect an intruder 208 and a suspicious object 209 held by the intruder 208, a far-infrared camera device 202 and a visible light camera device 203 are installed side by side so that their image characteristics are used for coordinated processing.

Now, by referring to photographed images and processed images, an outline of the coordinated processing of the image characteristics will be explained.

Figure 3A:
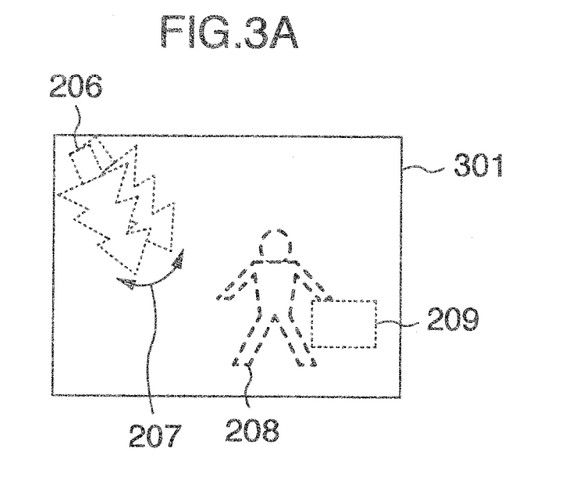
FIG. 3A shows a thermal image picked up by the far-infrared camera of one embodiment of this invention and its processed image.
Figure 3B:
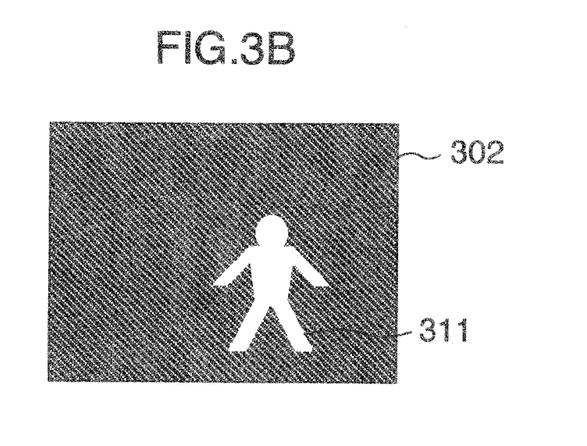
FIG. 3B shows a thermal image picked up by the far-infrared camera of one embodiment of this invention and its processed image.
Figure 3C:
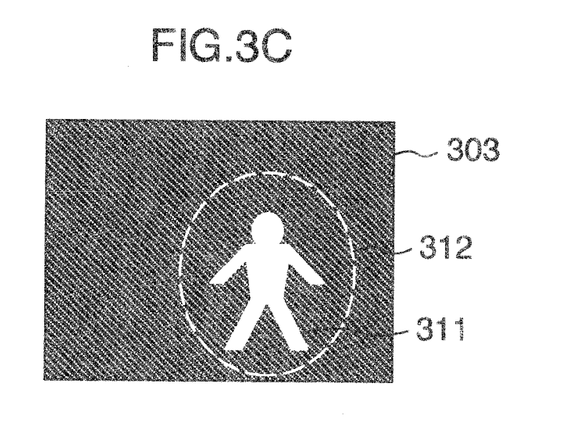
FIG. 3C shows a thermal image picked up by the far-infrared camera of one embodiment of this invention and its processed image.

FIG. 3A to FIG. 3C are a thermal image picked up by the far-infrared camera 2 and its processed image. FIG. 4A to FIG. 4D are an eye-viewed image picked up by the visible light camera 18 and its processed images.

As shown in FIG. 3A, the far-infrared lens 1 and the far-infrared camera 2 can take a thermal image based on the temperature of the object and thus produce a thermal image 301 for image processing. With the thermal image 301 of the intruder 208, it is possible to make visible only an object (e.g., heat radiating object) having a temperature different from the ambient. A spectrum of sunlight has almost no far-infrared components compared with the visible light components, that by eliminating strong reflections from metal surfaces, it is possible to remove normal sunlight reflections and the sway 207 of shadows or opposite of sunlight. However, since a suspicious, non-heat radiating object 209 has almost the came temperature as the surrounding, it has a low contrast and its visible image cart hardly be produced.

Figure 4A:
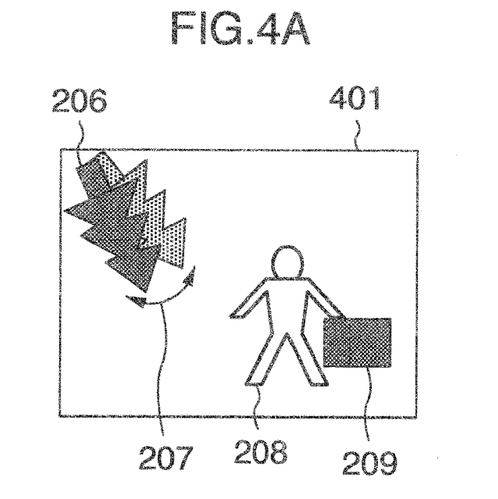
FIG. 4A shows an eye-viewed image picked up by the visible light camera of one embodiment of this invention and its processed image.

As shown in FIG. 4A, on the other hand, the optical lens 17 and the visible light camera 18 can produce an eye-viewed image 401. So, in addition to the intruder 208 and the suspicious object 209, the tree shadow 206 including its sway 207 as extraneous noise is taken as an image. Therefore, the result of detection of the intruder 208 based on the thermal image (position coordinates of the intruding object) is used for the detection of the suspicious object 209 based on the eye-viewed image of the visible light camera.

FIG. 3B shows a binary image 302 produced by binarizing the thermal image 301 and stored in the binary image memory 56 of the image processing device 31. Information on the shadow sway 207 and the suspicious object 209, both with low image levels, are lost, leaving only the image 311 of the intruder 208. The suspicious object 209, because it is carried by the intruder, exists near the intruder.

FIG. 3C is an image formed by overlapping an area range 312 over the binary image 302. The area range 312 is set around the intruder based on the size and coordinates of the intruder on the binary image memory 56. The coordinates of the area range 312 and a the coordinates of the intruder are sent as the area range information to a processing routine of the visible light camera.

Figure 4B:
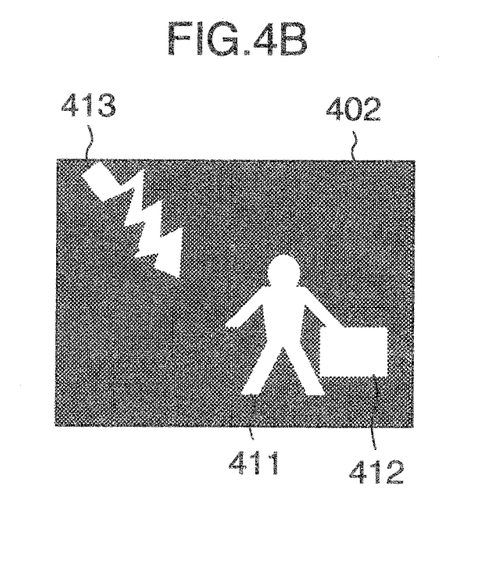
FIG. 4B shows an eve-viewed image picked up by the visible light camera of one embodiment of this invention and its processed image.

FIG. 4B is a binary image 402 produced by binarizing a difference between two eye-viewed images 401 picked up at different times. This renders visible the image 411 of the moving intruder and the image 412 of the suspicious object as well as the sway 413 of the tree shadow.

Figure 4C:
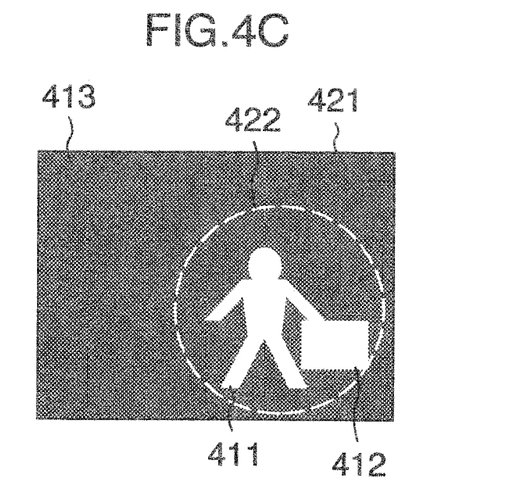
FIG. 4C shows an eye-viewed image picked up by the visible light camera of one embodiment of this invention and its processed image.

FIG. 4C shows an image (range-set image 421) produced by overlapping the area range information 14, that was received from the far-infrared image processing routine and then developed on the memory, over the binary image 402. When the area range information 14 is received, an area range 414 corresponding to the area range 312 is set. The area range 422 signifies an area where the intruder and suspicious objects are expected to be and therefore the object recognition operation needs to be executed only in that area. For example, a masking may be done in which the area range 422 is converted into addresses on the binary image memory 56 of the image processing device 32 and in which pixel values at other than the addresses are set to 0. Or the masking may not be performed up to the object recognition operation, with objects detected outside the area range 422 ignored.

Figure 4D:
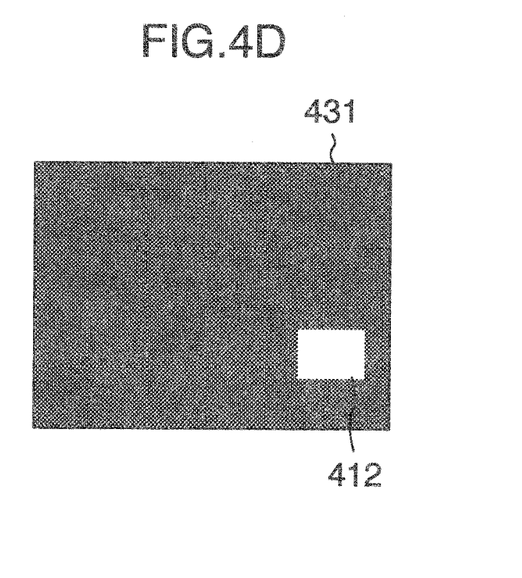
FIG. 4D shows an eye-viewed image picked up by the visible light camera of one embodiment of this invention and its processed image.

FIG. 4D is a final binary image 431, a difference between the range-set image 421 and the binary image 302. This is stored in the resultant image memory 55. In the area range 422, a comparison is made between the range-set image 421 and the binary image of only the intruder sent from the far-infrared processing routine, producing only a binary image 432 of the suspicious object.

The thermal image, such as shown in FIG. 3A to FIG. 3C, can clearly show the intruder when the temperature of the background terrestrial surface (road surface) is lower than that humans (e.g., 20°). However, when there is almost no temperature difference, the thermal image cannot: be used. In that case, the object recognition operation may exceptionally be performed on only the eye-viewed image and, by using a known technique of JP-A-7-29015 as required, tree shadow may be masked. Or using an algorithm for detecting only humans, an area range may be set. Normally, the weather condition in which such a temperature is reached is limited to a daytime of a sunny day, obviating the need to take fogy and rainy days into account. It is therefore easy to secure reliability in limited environments.

Next, the object detection system of this embodiment will, be described in detail.

Figure 5:
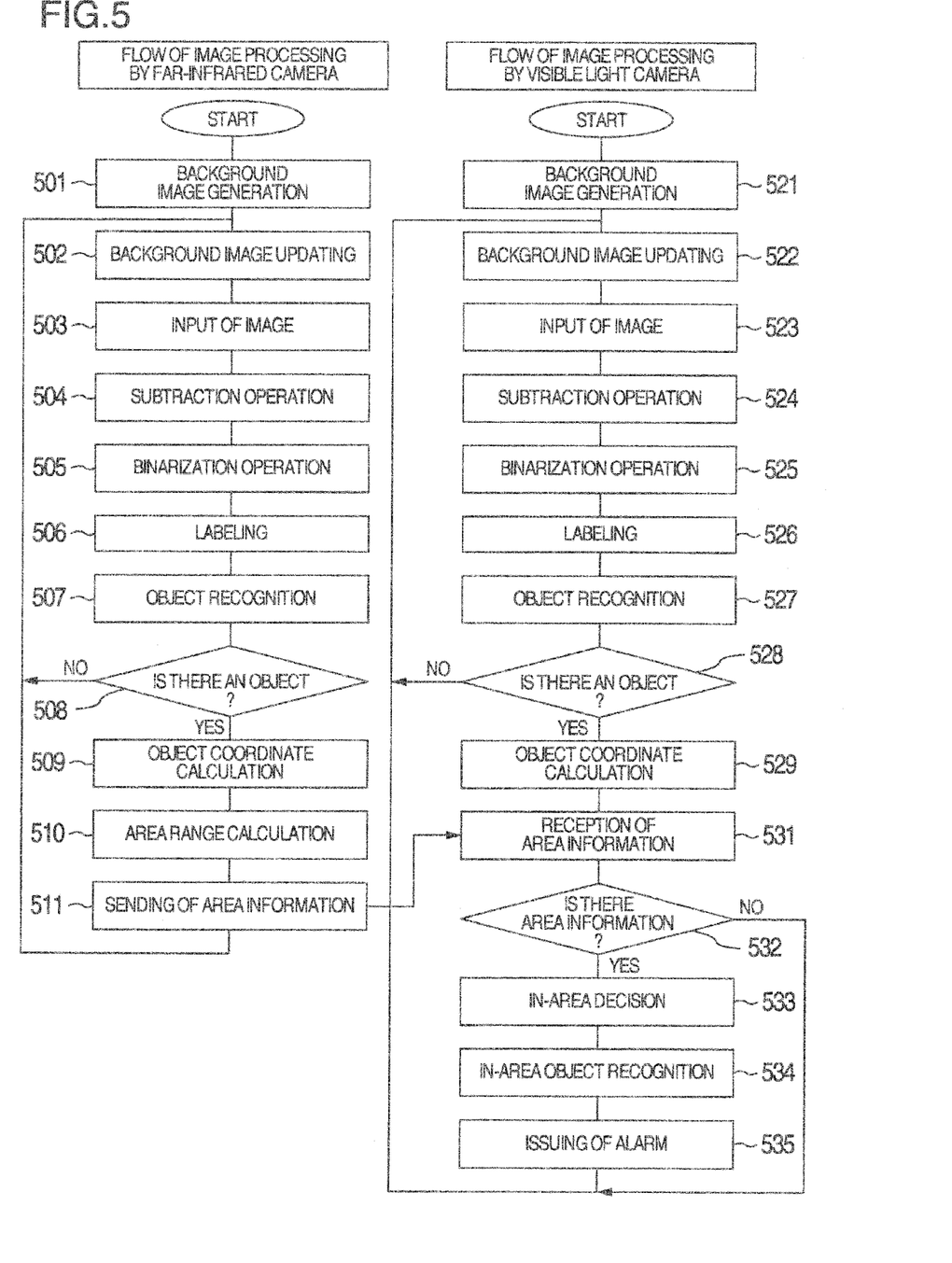
FIG. 5 shows an operation flow chart for the object detection system of one embodiment of this invention.

FIG. 5 is an operation flow chart of the object detection system of this embodiment. The CPU 6 of the image processing device 31 mainly executes processing 501 to 511 while the CPU 6 of the image processing device 31 mainly executes processing 521 to 536. The far-infrared camera video and the visible light camera video are both processed similarly in the operation from the background image generation (501, 521) to the object presence decision (508, 528).

First, operations commonly performed in both the image processing devices 31, 32 will be explained.

The background image processing 501, 521 are performed once at the beginning of the process and involve taking in the images picked up by the cameras through the image input I/F 4, storing the images in the input image memory 51 and initializing (writing 0s) the background image memory 52.

The background image update operations 502, 522 average the input image already stored in the input image memory 51 and the background image already stored in the background image memory 52 to generate a new background image and then store the generated background image again in the background image memory 52. This corrects the background image as the background changes over time.

The image input operations 503, 523 take in the images picked up by the cameras from the image input I/F 4 and write them over the input image memory 51. Since the images of the cameras to be compared are preferably of the same time, the image input I/F 4 is controlled (considering the responsiveness of the far-infrared camera 1) so as to be able to input images of essentially the same time. The image input operation 523, when overwriting the image in the memory, may perform an automatic gain, control and black/white level corrections, as necessary, to protect against effects produced by brightness variations as caused by lightening.

The subtraction operations 504, 524 use the work image memory 53 to calculate a difference between the background image of the background image memory 52 and the input image of the input image memory 51 and perform a filter operation such as median filtering, as necessary, before having the images represented by absolute values.

The binarization operations 505, 525 stores in the binary image memory 56 a binary image that is obtained by binarizing at a predetermined threshold the subtraction image produced by the subtraction operations 503, 523. The binary image takes either or 0 at each pixel according to the presence or absence of brightness.

The labeling operations 506, 526 search the binary image in the binary image memory 56 for aggregates or clusters of pixels whose value are 1, and number each of the aggregates. The aggregate is a group of 1-value pixels adjoining together vertically or laterally (diagonally).

The object recognition operations 507, 527 recognize as objects those labeled aggregates which have a predetermined size (height, width).

The object recognition operations 508, 528 check if there are one or more of the object detected by the object recognition operations 507, 527 is one or more. If so, the processing proceeds to the object coordinate calculation operations 509, 529. If not, the processing returns to the background image update operations 502, 522 where the same operation is repeated.

The process following the object coordinate calculation operations 509, 529 are the portion characteristic of this embodiment.

First, the processing performed by the image processing device 31 will be explained.

The object coordinate calculation operation. 509 takes the object detected by the object recognition operation 507 as an intruder and then calculates the position and size of the intruder. As for the position of the intruder, a center between the upper and lower ends of the aggregate recognized as an object may be taken as a vertical position and a center between the right left ends of that aggregate as a lateral position. A difference between the lower and upper ends of the aggregate (and a difference between left and right ends) may be taken as its size.

The area range calculation operation 510 estimates, from the position and size of the intruder obtained by the object coordinate calculation operation 509, a position of the object carried by the intruder and determines it as the area range. For example, the area range may be defined by a circle that is centered at the position of the intruder and which has a radius a predetermined constant value times the size of the intruder.

The area information send operation 511 sends the area range calculated by the area range calculation operation 510 through the external I/F 11 to the routine of the image processing device 32 that processes visible light. It also sends to the image processing device 32 the binary image within the area range or information about the coordinates on the image memory corresponding to the object position calculated by the object coordinate calculation operation 509.

Next, processing characteristic of the visible light image processing device 32 will be explained.

The area information reception operation 531 receives the area range information sent from the area information send operation 511.

The area presence check operation 532 checks if there is the area range information received by the area information reception operation 531. If the information exists, the process moves to the next in-area decision operation 533. If not, the process returns to the background image update operation 522 where these operations are repeated.

The in-area decision operation 533 takes difference (or performs a masking operation) between the binary image of the binary image memory 56 and the binary image within the area range of the area range information received (or the binary image acquired by referencing the memory coordinate information received and accessing the image processing device 31), and then stores the difference in the resultant image memory 55.

The in-area object recognition operation 534 checks the size of the objects remaining in the subtraction image of the resultant image memory 55 and, based on the memory coordinates and the number of objects, determines whether the objects are the target (suspicious objects) to be detected. The result of check is handed over to the alarm output operation 416.

The alarm output operation 535, based on the result of the in-area object recognition operation 534, issues an alarm from the external I/F 11.

Here, additional explanations for the background image update operations 502, 522 will be given. This operation adds up each pixel value of the input image multiplied by a weight (oblivion coefficient) w and each pixel value of the background image multiplied by a weight 1−w to produce new pixel values of the background image w takes a value ranging from 0 to 1. If it takes a value of 1, the process becomes a frame subtraction method that uses an image one frame before as the background image. If it takes a value less than 1, the process becomes a background subtraction method. In the case of the background subtraction method, w is generally set so that the averaging time constant is sufficiently greater than the time it takes for various intruding objects to pass through the view angle. Taking an average over such every long duration of time makes it possible to generate a background image showing no intruding objects even from a video that shows intruding objects coming in and going out at all times.

In addition to a method of updating all pixels, it is also possible to mask the input image with the binary image of the binarization operations 505, 525 or with, pixel aggregates recognized as objects, thus updating only the pixels in areas where no objects are seen. Still another possible method is to update pixels also in areas where objects are seen, every predetermined duration of time.

The background image update operation 502 of this example is executed mainly to detect moving objects by the subtraction operation, whereas the background image update operation 522 is intended mainly to cancel the radiation components (housing components) from the far-infrared lens 1 and the far-infrared camera 2 themselves by the subtraction operation.

Additional explanation will be given about the operation characteristic of the visible light image processing device 32. If there is no need to detect a suspicious object separately from an intruder, the in-area decision operation 533 is not required. Even without the in-area decision operation 533 being executed, the in-area object recognition operation 534 can detect only the moving objects (intruder and suspicious objects carried by the intruder) picked up by the visible light camera within the area range. Since this eliminates motionless heat radiating objects, the detection accuracy of the far-infrared camera improves.

In this embodiment, prior to the object recognition operation 508, the ambient temperature (temperature of ground surface) is calculated from the thermal image. If the ambient temperature is within a predetermined range, the process moves to the object recognition operation 508. If it is outside the range, the process sends a detection failure signal to the image processing device 32. The image processing device 32, even if it receives no area information from the image processing device 31, may make its own setting for the area range and the mask area in order to continue the processing equivalent to that of the in-area decision operation 533.

Embodiment 2

The object detection system of this embodiment has an additional function of an abandoned object detection. That is, when an object that has already been detected within the area range is later detected outside the area range, it is decided that the object was abandoned.

Constructions in this embodiment are similar to those of embodiment 1 unless otherwise specifically described.

The labeling operation 526' attaches detection labels 0, 1, 2, . . . to the aggregates of pixels in the order of detection using a 4-nearest neighbor (8-nearest neighbor) algorithm and a block line algorithm and at the same time updates a table that stores the positions of pixel aggregates (e.g., center value), detection labels, group labels (described later) and motion vectors (size of aggregates), all related to one another for each aggregate. It is noted, however, that the table contains two labeling results—previous and current labeling—and that at the time of the current update, the group label and the motion vector have not yet been calculated. Then, from the previous position and motion vector of the aggregate, the current position of the aggregate is estimated. From the current position, an aggregate nearest that position is searched. The aggregate thus found is attached with the same group label as the previous one and at the same time a current motion vector is calculated to update the table. There is no need to search through all aggregates but the search may be made through those aggregates attached with detection labels close to the previous detection label value. Next, among the rest of the current aggregates, whose labels are not close to that of: the previous aggregate, those aggregates whose position intervals are within a predetermined range and whose motion vectors are similar to each other are grouped together and assigned a new group label. Further, for the aggregates already given a group label, the validity of the group is verified and they are regrouped as required. In that case, a continuity, before and after the regrouping, of the sum of aggregate sizes may be taken into consideration. With this grouping method, the aggregate that has once been detected as an object candidate will continue to be assigned a persistent group label.

The in-area object recognition operation 534' performs the following operation in addition to those of embodiment 1. When a suspicious object is detected within the area range, the group number (or label) of that object is related to the area range information and suspicious object detection time before storing these information as the previous detection result. At the same time, the previous detection result and those that have passed a predetermined duration of time, or the previous detection result of another intruder are erased. When a change in area range from the previous detection result has exceeded a predetermined value, it is decided that the intruder differs from the one found by the previous detection result.

Further, a search is made to see if an object with the same group number as the suspicious object stored in the previous detection result exists outside the current area range. If the object is found, the result is handed over as an abandoned object alarm to the alarm output operation 416.

Although in this example the suspicious object has been described to be attached with a persistent label, it is possible to track the object according to a template matching that uses as a template the image of the suspicious object found within the area range, and then detect when it comes out of the area range.

While in embodiment 1 and 2 described above, two imaging means for visible light and far-infrared light have been described to be used, it is obvious that one of them needs only to be set for the area range. This means that they do not have to be imaging means whose pixels can conduct image-pickup essentially at the same time. It is therefore possible either to mechanically scan a single directivity far-infrared sensor or to execute a sensor detection at only predetermined number of locations and selectively set the area range according to the sensor used.

Further, a third electromagnetic wave detection means with a different sensitivity wavelength (imaging means or sensor means) may be provided. Based on a plurality of detection results obtained by executing coordinated processing on two or more of the detection means, an AND decision, OR decision or weighted decision may be made.

Embodiment 3

The object detection system of this embodiment uses a scan optical system 101, a laser ranging device 102 and an image processing device 131 in place of the far-infrared lens 1, far-infrared camera 2 and image processing device 31 of embodiment 1. The scan optical system 101 scans a beam of the laser ranging device 102. The laser ranging device 102 measures a distance based on a round trip time of the laser pulse. These are interlocked, to produce a two-dimensional image having a brightness value corresponding to the distance. The image processing device 131 needs only to perform the same processing as the image processing device 31. Since the distance image is not subjected to influences of sways of shadows produced by sunlight, the same effect as embodiment 1 can be obtained.

While in the above embodiments an object carried by a human, is considered to be a suspicious application but may also be applied to a load carried on a vehicle. In that case, it is noted that there is a weak point with the far-infrared camera. Take, for example, a truck running in a rainy day. Although heat radiating portions, such as engine axles, can be clearly visualized, a loading platform is wet and has almost: the same temperature as the ambient, so that it cannot be visualized, making it impossible to appropriately set an area range for the platform. In that case, based on the position check result of engine and axles, an area where the loading platform is likely to be in an entire truck image is determined by performing the image processing with the visible light camera. From this result it is also possible to check the size of the loading platform of the truck.

Although the above descriptions have been made of this invention as applied in the example embodiments, it is apparent to those skilled in the art that the invention is not limited to these applications and that various modifications and changes may be made within the spirit of the invention and a scope of appended claims.

The invention claimed is:

1. An object detection system for detecting an object, wherein the system executes coordinated processing on detected information, the system comprising:
   a first electromagnetic wave detection means; and
   a second electromagnetic wave detection means,
   wherein the first electromagnetic wave detection means and the second electromagnetic wave detection means have different sensitive wavelengths,
   wherein the first electromagnetic wave detection means picks up a first image of an object being monitored as a two-dimensional; image, the second electronic wave detection means picks up a second image of the object being monitored as a two-dimensional image, and the first image and the second image include essentially the same object being monitored, wherein the second electronic wave detection means determines an area range of the object, the area range being determined from a position of the object in the second image, wherein the second electronic wave detection means sends area information to the first electronic wave detection means, the area information including the area range and a portion of the second image included within the area range, wherein the first electromagnetic wave detection means receives the area range information from the second electronic wave detection means, and uses the area range information to perform image processing, and wherein, in the two-dimensional image picked up by the first electromagnetic wave detection means, image processing is performed in the area range to detect the object.

2. The object detection system according to claim 1, wherein the first electromagnetic detection means and the second electromagnetic detection means are selected from the group consisting of a visible light camera, a far-infrared camera, a millimeter wave camera, and a laser sensor.

3. The object detection system according to claim 1, wherein the first electromagnetic wave detection means is a visible light camera and the second electromagnetic wave detection means is a far-infrared camera, the visible light camera and the far-infrared camera being arranged side by side to pick up the first image and the second image, respectively, the visible light camera and the far-infrared camera having essentially a same angle of view, wherein each of the two-dimensional images picked up by the visible light camera and the far-infrared camera is subjected to a background image generation and update operation, a subtraction operation between the background image and the two-dimensional image, a binarization operation and a labeling operation, to recognize the object, wherein the area range represents an area where a human or suspicious object being carried by the human is expected to be and is determined so as to surround a figure of the human, and wherein, in the two-dimensional image taken by the visible light camera, the object recognition operation is performed again within the area range, and if an object is recognized, it is decided that the recognized object is the human or the suspicious object to be detected.

4. The object detection system according to claim 3, wherein the object recognition operation performed in the area range is an operation that involves masking a binary image of the two-dimensional image picked up by the visible light camera with the image of the object recognized in the two-dimensional image picked up by the far-infrared camera to obtain a binary image and deciding from the newly obtained binary image that an object not picked up by the far-infrared camera is the suspicious object to be detected.

5. The object detection system according to claim 3, wherein, after the object in the area range has been determined to be the suspicious object to be detected, if the object is detected outside the current area range, the object is decided to be an object abandoned by the human.

* * * * *